United States Patent
Russell et al.

(10) Patent No.: US 7,760,230 B2
(45) Date of Patent: Jul. 20, 2010

(54) METHOD FOR AUTOMATICALLY REDUCING STORED DATA IN A SURVEILLANCE SYSTEM

(75) Inventors: Stephen G. Russell, San Francisco, CA (US); Robert P. Vallone, Palo Alto, CA (US); J. Andrew Freeman, San Jose, CA (US); Stephen D. Fleischer, San Francisco, CA (US); Gordon T. Haupt, San Francisco, CA (US)

(73) Assignee: 3VR Security, Inc., San Francisco, CA (US)

(*) Notice: Subject to any disclaimer, the term of this patent is extended or adjusted under 35 U.S.C. 154(b) by 1320 days.

(21) Appl. No.: 11/082,027

(22) Filed: Mar. 15, 2005

(65) Prior Publication Data

US 2005/0271251 A1 Dec. 8, 2005

Related U.S. Application Data

(63) Continuation-in-part of application No. 10/965,687, filed on Oct. 13, 2004, now Pat. No. 7,697,026.

(60) Provisional application No. 60/554,050, filed on Mar. 16, 2004.

(51) Int. Cl.
*H04N 7/12* (2006.01)
(52) U.S. Cl. ........................ 348/143; 348/150; 348/151; 348/152; 348/153; 348/154; 348/155; 348/156
(58) Field of Classification Search .................. 348/143, 348/150–156
See application file for complete search history.

(56) References Cited

U.S. PATENT DOCUMENTS

| 5,539,454 | A | 7/1996 | Williams | .................... 348/169 |
|---|---|---|---|---|
| 6,011,901 | A | * 1/2000 | Kirsten | ........................ 386/123 |
| 6,097,429 | A | 8/2000 | Seeley et al. | |
| 6,154,133 | A | 11/2000 | Ross et al. | |
| 6,184,926 | B1 | 2/2001 | Khosravi et al. | |
| 6,188,381 | B1 | 2/2001 | van der Wal et al. | ......... 345/112 |

(Continued)

FOREIGN PATENT DOCUMENTS

EP 0 947 963 A1 6/1999

(Continued)

OTHER PUBLICATIONS

"Written Opinion of the International Preliminary Examining Authority" received in related International application No. PCT/US2005/008655.

(Continued)

*Primary Examiner*—Andy S. Rao
*Assistant Examiner*—Geepy Pe
(74) *Attorney, Agent, or Firm*—Hickman Palermo Truong & Becker LLP (57) ABSTRACT

A method of managing video data storage in a video surveillance system is disclosed. The disclosed methods extend the amount of calendar time for which video and image data can be stored on a storage device. The disclosed methods apply decision criteria, such as rules, configuration data and preferences, to support intelligent automatic reduction of stored surveillance data such that images and video data of most interest are maintained while less important data is deleted, compressed or archived.

58 Claims, 5 Drawing Sheets

U.S. PATENT DOCUMENTS

| | | | |
|---|---|---|---|
| 6,476,858 | B1 | 11/2002 | Diaz et al. |
| 6,542,075 | B2 | 4/2003 | Barker et al. |
| 6,583,813 | B1 * | 6/2003 | Enright et al. .............. 348/150 |
| 6,646,676 | B1 | 11/2003 | DaGraca et al. |
| 6,725,383 | B2 | 4/2004 | Kyle |
| 6,791,603 | B2 | 9/2004 | Lazo et al. |
| 2002/0030738 | A1 | 3/2002 | Moreinis et al. |
| 2003/0123713 | A1 | 7/2003 | Geng |
| 2004/0001142 | A1 | 1/2004 | Kumhyr |
| 2004/0001615 | A1 | 1/2004 | Philomin et al. |
| 2004/0008258 | A1 | 1/2004 | Aas et al. |
| 2004/0028391 | A1 | 2/2004 | Black et al. |
| 2004/0042643 | A1 | 3/2004 | Yeh |
| 2004/0078260 | A1 | 4/2004 | Milgramm et al. |
| 2004/0080615 | A1 | 4/2004 | Klein et al. |
| 2004/0086093 | A1 | 5/2004 | Schranz |
| 2004/0095236 | A1 | 5/2004 | Sobol |
| 2004/0117638 | A1 | 6/2004 | Monroe |
| 2004/0130620 | A1 | 7/2004 | Buehler et al. |
| 2004/0161133 | A1 | 8/2004 | Elazar et al. |
| 2004/0183667 | A1 | 9/2004 | Nicoletti et al. |
| 2005/0232462 | A1 | 10/2005 | Vallone et al. .............. 382/103 |

FOREIGN PATENT DOCUMENTS

| | | |
|---|---|---|
| WO | WO 03/047258 | 6/2003 |

OTHER PUBLICATIONS

Pending claims of related International application No. PCT/US2005/008655.

Notification of Transmittal of the International Search Report and the Written Opinion of the International Searching Authority, or the Declaration received in PCT International application No. PCT/US2005/008655.

Pending claims of PCT International application No. PCT/US2005/008655.

"Notification of Transmittal of the International Preliminary Report on Patentability" received in International application No. PCT/US2005/008655.

Current claims of PCT/US2005/008655.

"Notification of Transmittal of the International Preliminary Report on Patentability" received in International application No. PCT/US2005/008735.

Current claims of PCT/US2005/008735.

* cited by examiner

METHOD FOR AUTOMATICALLY REDUCING STORED DATA IN A SURVEILLANCE SYSTEM

PRIORITY CLAIM

This application claims the benefit of priority to U.S. Provisional Patent Application No. 60/554,050 filed on Mar. 16, 2004, entitled VIDEO INTELLIGENCE PLATFORM, which is hereby incorporated by reference. This application also claims priority to and is a continuation in part of U.S. patent application Ser. No. 10/965,687, entitled PIPELINE ARCHITECTURE FOR ANALYZING MULTIPLE VIDEO STREAMS, filed on Oct. 13, 2004 now U.S. Pat. No. 7,697,026; and is related to U.S. patent application Ser. No. 11/081,753, entitled INTERACTIVE SYSTEM FOR RECOGNITION ANALYSIS OF MULTIPLE STREAMS OF VIDEO, filed on Mar. 15, 2005 ; and U.S. patent application Ser. No. 11/082,026, entitled INTELLIGENT EVENT DETERMINATION AND NOTIFICATION IN A SURVEILLANCE SYSTEM, filed on Mar. 15, 2005; the contents of which are herein incorporated by reference in their entirety for all purposes.

FIELD OF THE INVENTION

The present invention relates to the storage and archiving of data in a video surveillance system. In particular, the present invention includes methods of automatically reducing the amount of data stored by a video surveillance system. User-entered preferences and rules can be used to determine how to assess the importance of data stored in the surveillance system, and how to reduce the stored data based on its assessed importance.

BACKGROUND

Video surveillance systems have wide application and can be used in a number of settings such as residential, commercial, governmental and industrial. Typically, one or more video cameras are strategically positioned in a protected or secure area, and used to capture images of people and other objects that come within the range of the cameras. Video surveillance systems can transmit surveillance information via wire-based and wireless technology, and across the Internet.

In addition to real-time monitoring by security personnel, many surveillance systems record and store surveillance footage to video tape or other medium for future reference and analysis. With the advent of digital storage, it is now possible to store video footage to a wide variety of digital storage devices, such as computer hard drives, optical disks and Digital Video Disks (DVDs).

In those systems that record video footage, all footage produced by a surveillance camera is typically stored in its entirety. The digital files generated by a video camera are very large and require a great deal of storage space. In addition, in order for a surveillance system to fully monitor an area, multiple cameras are generally required. As the number of cameras in a surveillance system increases, the amount of video data that is to be stored also increases.

In order to accommodate these storage requirements, many current surveillance system architectures make use of video archives that roll over after a certain timeframe. For example, a system may include a set of video tapes or computer disks that can store two months worth of continuous surveillance data. For two months, surveillance data is sequentially written to the set of tapes or disks until the set is full. At this point, the set of tapes or disks is re-used, starting with the first tape or disk that contains the oldest data. Any new video surveillance data is then stored on the first tape or disk in the set, overwriting the old surveillance data. Obviously, older surveillance video data, which may still have value, is lost in a system that performs rollover storage.

Alternatively, some systems back up or archive all video data wholesale to archival media once the data has become "stale." That is, all data captured by the surveillance system is archived after a set period of time passes after the data is captured. In these systems, once data has been archived, it is no longer readily available to a user of the system. The archival media must be identified and loaded in order to view or obtain information about a particular event caught by surveillance video. Typically in these systems, all data is archived, and any data that is archived remains on the archival media permanently.

Although this method allows data to be stored for a long period of time, there is no practical way to identify, extract or peruse archived surveillance data. In order to view archived surveillance data of an event, a user must know exactly where in the voluminous surveillance data archive that the video containing the event resides. Sometimes, a user may be able to locate a section of the archived surveillance data to search for the video data of interest if the user knows some information about the timeframe and/or video camera in which the video was taken. However, even if a section of archived surveillance data can be identified, the user must still review that entire section of archived data in order to find the relevant video data. In many cases, this can be a complex and time consuming task, as many archival disks or other media may need to be identified, brought out of storage, loaded into the system and reviewed by a user before the video data of interest can be found.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENTS OF THE INVENTION

Embodiments of a system that intelligently extends the amount of calendar time for which video and image data can be stored on a security video storage device are described herein. Embodiments of the present invention allow data to be quickly found and retrieved. Instead of archiving or overwriting all data, embodiments of the present invention determine the importance of certain surveillance data and use the determined relative importance of the data to determine whether to delete, archive, or otherwise reduce the data, thereby greatly improving the data storage efficiency of a surveillance system.

Techniques are provided for intelligently storing surveillance data in a video surveillance system. These techniques may be used, for example, to automatically determine whether to delete, compress, archive or store surveillance data depending on the relative importance of the data.

Methods of extending the amount of calendar time for which video and image data can be stored on a security video storage device are provided herein. The disclosed methods apply decision criteria, such as rules, configuration data and preferences, to support intelligent automatic reduction of stored surveillance data such that data of most interest and most value are maintained while less important data is deleted, compressed or archived. The disclosed methods can be applied to all data stored in a surveillance system such as, for example, video data, audio data, images, or metadata. This intelligent data reduction frees up space on surveillance video storage devices—effectively substantially extending the amount of calendar time that can be stored on a storage device of a given size compared to other current systems.

The techniques described herein provide for managing video data storage in a video surveillance system by obtaining data storage management rules from a user and applying the rules to the stored video data. The data storage management rules include data storage rules and data importance assessment rules. The video data generated by the video surveillance system is stored in accordance with the data storage rules, and video data storage is automatically updated in accordance with the data storage rules and the data importance assessment rules.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS OF THE INVENTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Disclosed herein is a method of managing the storage of video surveillance data by determining which portions of the video surveillance data are least interesting or important. In order to most effectively use video surveillance storage space, the system intelligently "prunes" the stored video data by discarding, compressing, and/or transferring to archival media the least important video data. The surveillance system may be configured to automatically reduce data on a regular, ongoing basis. Alternatively, or in addition, surveillance system data may be reduced on an ad hoc basis.

The "importance" of data as used in the present invention is an abstract concept that can be defined and determined in any number of ways. Methods of determining importance of data and methods of "pruning" data based on its determined importance are discussed in detail herein.

Exemplary System

Figure 3:
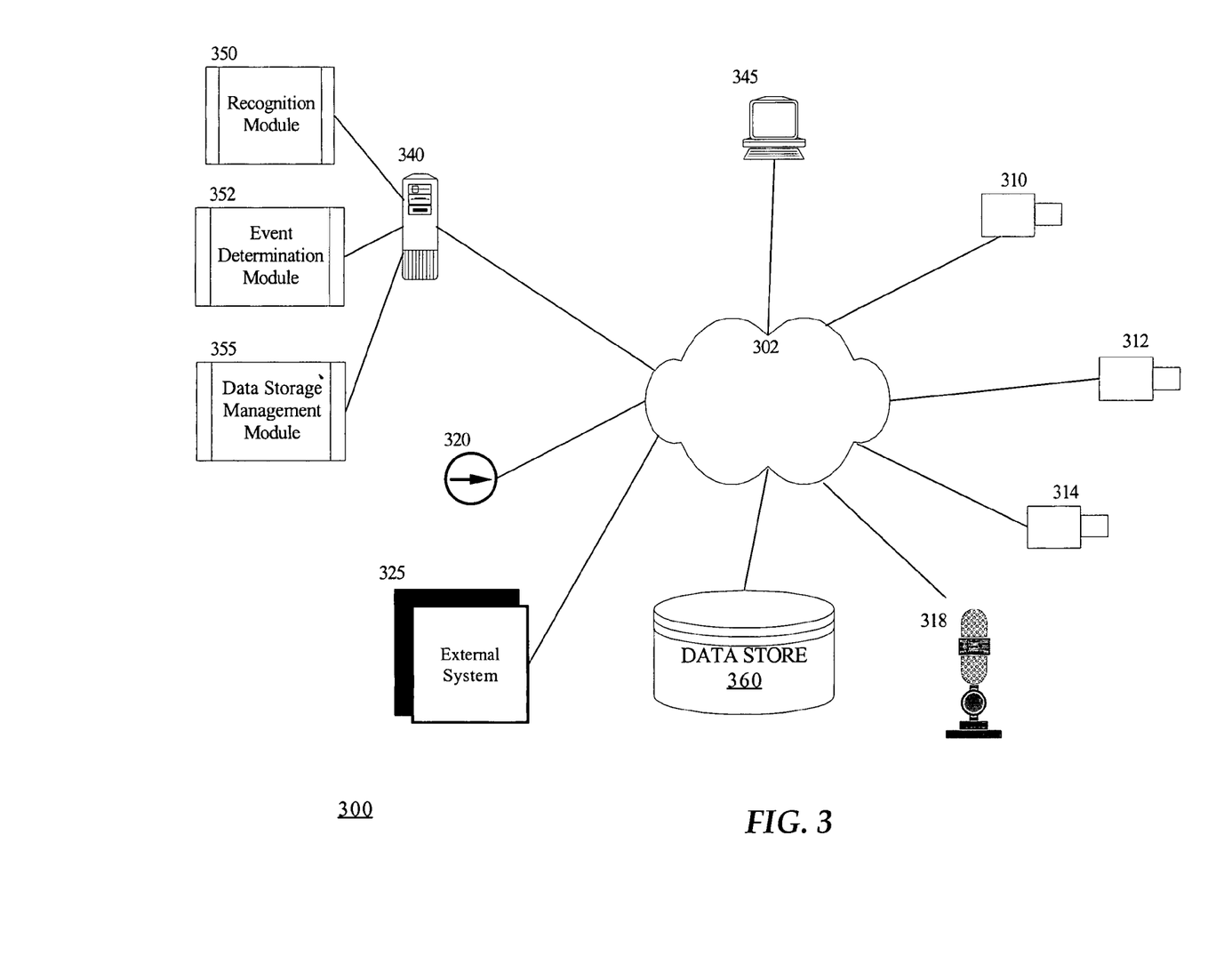
FIG. 3 is a diagram that illustrates a high-level view of a video surveillance network on which an embodiment of the invention may be implemented.

FIG. 3 illustrates a high-level pictorial representation of a video surveillance network 300 in which an embodiment of the present invention may be implemented. As shown, video cameras 310, 312, 314 are connected to surveillance network 302, as are audio recorder 318, server 340, sensor 320, external system 325, user terminal 345 and data store 360. Network 302 is the medium used to provide communications links between various devices and computers connected together within the system. Surveillance network 302 may be implemented as any type of network, such as an intranet, a local area network (LAN), a wide area network (WAN), or any combination thereof. The network 302 may also comprise secure connections to the Internet. Network 302 may include connections such as wire, wireless communication links, or fiber optic cables, for example. Alternatively, instead of a network, some or all of the components of the surveillance system may be directly connected to each other.

Video cameras 310, 312 and 314 may be any cameras used in a video surveillance system, either visible or hidden from persons surveyed by the surveillance system. Cameras 310, 312, 314 may operate in the visual range of the electromagnetic spectrum or may include other ranges including infrared (IR) and ultraviolet (UV). In addition, a camera may also have light amplification capabilities for low light conditions. Cameras 310, 312, 314 may be identical, or each may have different capabilities.

Audio recorder 318 may be used in conjunction with the images acquired by cameras 310, 312, 314 to identify an object. While shown in the example embodiment of FIG. 3, audio recorder 318 is not required. In one embodiment, cameras 310, 312, 314 may include audio recording functionality, which may be used as audio recorder 318.

The surveillance system shown in FIG. 3 includes sensor 320 and external system 325. Sensor 320 may be any type of sensor that could be used by a surveillance system, such as a motion detection sensor or smoke detector. External system 325 may be any type of external system that can communicate with surveillance system 300, such as an alarm system, environmental input system, access control system or biometric identification system. Sensor 320 and external system 325 are optional. Zero, one or more of each may be included.

Recognition module 350 extracts identifying information from the video data produced by cameras 310, 312, 314 and/or voice recorder 318. For example, any face finding routine known to those skilled in the art may be used to extract identifying information. Recognition module 350 then processes the extracted identifying information to determine if the extracted identifying information matches identifying information stored in data store 360. Any method known to those skilled in the art can be used to compare extracted facial identifying features. Recognition module 350 may optionally include sound recognition functionality that distinguishes between known and unknown sounds. For example, recognition module 350 may include voice recognition functionality that compares voice samples taken with audio recorder 318 and compares them with known voiceprints stored in data store 360. Many implementations of voice recognition are known to those skilled in the art and can be used.

Event Determination module 352 determines whether an "event" has occurred by accessing information stored in data store 360, such as surveillance system management information, video data from other cameras in a multi-camera system and/or information from external system 325 or sensor 320.

As shown in FIG. 3, Recognition module 350 and Event Determination module 352 may be components of server 340. Alternatively, Recognition module 350 and/or Event Determination module 352 may reside in separate computers dedicated to performing just object recognition and/or event determination.

User terminal 345 is used to provide preferences, configuration and system management information to server 340. In one embodiment, user terminal 345 is directly connected to server 340. More than one user terminal may be used to provide preferences, configuration and system management information. Preferences, configuration and system management information entered through user terminal 345 are discussed in more detail herein.

Data store 360 may contain one or more databases and/or file stores of video data recorded by cameras 310, 312, 314. Video data stored in data store 360 may include single frames or images, as well as video clips. Data store 360 may also include one or more databases of audio or voice samples captured by the surveillance system. Data store 360 may also contain data from external systems that is used by the video surveillance system. For example, video data from another surveillance system, audio data from an external system, or biometric information from an external system may be stored in data store 360.

In addition, data store 360 may also contain one or more reference databases of identifying information associated with objects or persons surveyed by the multi-camera surveillance system. Data store 360 may contain additional databases that store surveillance system management information, such as user-entered preferences, configuration and system management information. Other databases in data store 360 may include information relating to the objects and events recognized by the system, in particular metadata about events and objects, as discussed in more detail herein.

Data store 360 may include several separate databases, each containing a different type of data, or data store 360 may include only a single database for storing all data. Many configurations for storing data within data store 360 will be apparent to those skilled in the art.

Data store 360 is intended to include any computer or digital media that stores video data, metadata extracted from video data, object identifying information, user-entered preferences, configuration and other surveillance system management information. Video data stored in the system may be video data captured by cameras in the surveillance system, or may originate outside of the surveillance system, and metadata can be extracted from any video data (or other type of data, such as audio data), no matter its source. Data store 360 is accessible by Recognition module 350, Event Determination module 352 and Data Storage Management module 355.

Data store 360 may be one device. Alternatively, different types of data stored in data store 360 may be stored on separate storage devices in separate locations. For example, video data may be stored on removable disks that can be archived offsite, while specific images extracted from the video data, along with event and object metadata associated with the extracted images, are stored in a database located on a hard drive that is readily accessible at all times. The separation of metadata from video data is discussed in more detail herein.

Surveillance system 300 may include additional detection means, servers, clients and other peripheral devices not shown. For example, surveillance system 300 may also include Radio Frequency identification transponders used to identify individuals or objects to which the transponder is attached. FIG. 3 is intended as an example, and not as an architectural limitation for the present invention.

Data Storage Management module 355 intelligently manages how data is stored within Data Store 360 based on criteria entered by a user through user terminal 345, objects recognized by Recognition module 350, and events determined by Event Determination module 352. In one embodiment, Data Storage Management module 355 accesses information stored in data store 360 to determine when and how to reduce video surveillance data stored therein. Methods of implementing Data Storage Management module 355 are discussed herein.

Surveillance System with Pipeline Architecture

Figure 1:
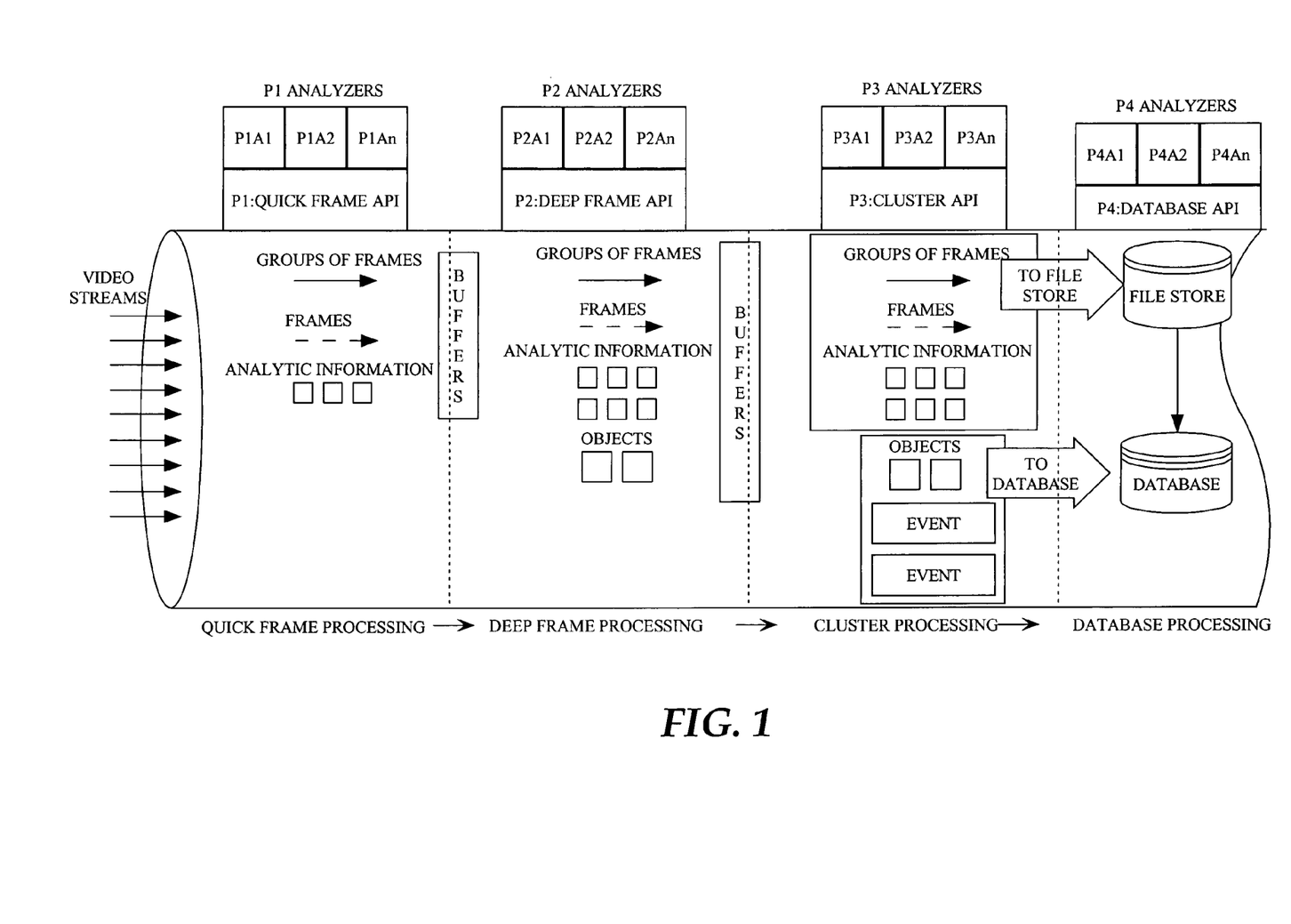
FIG. 1 is a block diagram that illustrates a multi-camera video processing pipeline architecture upon which an embodiment of the invention may be implemented.

One specific example of multi-camera architecture that could be used to implement an embodiment of the present invention is disclosed in co-pending application U.S. patent application Ser. No. 10/965,687, entitled PIPELINE ARCHITECTURE FOR ANALYZING MULTIPLE VIDEO STREAMS, filed on Oct. 13, 2004, the contents of which are herein incorporated by reference in their entirety for all purposes. FIG. 1, taken from this co-pending application, hereinafter referred to as the "Pipeline Application", illustrates an embodiment of the multi-camera pipeline architecture that may be used to implement a multi-camera surveillance system.

In the system disclosed in the Pipeline application, the content of multiple video streams from multiple cameras is analyzed to identify objects and potential events of interest in the video streams. For example, a surveillance video stream may be analyzed to recognize faces, gestures, vehicles, guns, motion, and the like.

The video processing pipeline architecture disclosed in the Pipeline application provides for parallel analysis of multiple input video streams, each video stream originating from a respective video camera in the surveillance system, at multiple stages of processing.

In one embodiment, the pipeline comprises four different successive stages of processing: (1) quick frame processing; (2) deep frame processing; (3) cluster processing; and (4) database processing. Due to the nature of the pipeline, applications plugged into the pipeline, via application program interfaces (APIs) associated with each respective stage, can perform increasingly more complex analysis at each successive stage of processing.

Generally, as the video data flows down the pipeline, (1) portions of the video data that are considered uninteresting are removed from the stream, thereby reducing the size of video data that flows further down the pipeline; (2) portions of the video data that are considered potentially interesting to an application at a given stage are analyzed, with a goal of identifying features, activities, objects, etc. of interest; and (3) analyzed portions of the video data may be annotated by the analyzing applications, with information that describes what the applications identified as interesting in that portion of the video data, such as object identification or event determination.

Stage 1 of the pipeline processing ("P1") is referred to as "quick frame" processing. Quick frame processing is lightweight processing (i.e., not relatively resource-intensive and computationally complex) performed in real-time as the video streams flow into the pipeline. Various applications tailored to recognize and identify certain occurrences may plug into the pipeline via the quick frame API, to perform fast lightweight operations, such as noise reduction, video motion detection, gross object finding (e.g., a vehicle or person), object tracking, frame area filtering, and the like. For example, Recognition Module 350 may include a gross object filtering process that uses the quick frame API.

Stage 2 of the pipeline processing ("P2") is referred to as "deep frame" processing. Any number of video analysis applications (referred to in FIG. 1 as P2 Analyzers, P2A1, P2A2, P2An) can access the video feeds from the buffers that reside between quick frame and deep frame stages, through a deep frame API. Various applications tailored to recognize and identify certain occurrences may plug into the pipeline via the deep frame API, to perform more computationally complex and resource-intensive analyses operations than with quick frame processing. For example, deep frame analyses of the video streams may include face finding, license plate recognition, complex object detection (e.g., gun finding), feature extraction, and the like.

When the techniques described herein are described in terms of a pipeline architecture system, an application to identify frames of surveillance video that contain an image of a person's face may be included as a "P2" application that uses the deep cluster API. Likewise, an application used by Recognition module 350 to extract features from faces identified in frames of surveillance video may also be included as a "P2" application.

If any P2 analyzer finds particular frames to be of interest, then the analyzer determines what type of analysis to perform on the video data and creates objects based thereon. For example, a P2 analyzer may create a motion object that includes information that characterizes that motion occurred in a given camera view (i.e., a given video stream) starting at time X and ending at time Y. Objects created at the deep frame processing stage typically contain a pointer or link to one or more relevant frames, and additional information about the content of the frame on which the object is based. Sequences of objects are output from the deep frame processing stage and, in one embodiment, are queued in a buffer between the deep frame processing stage and the cluster processing stage.

Stage 3 of the pipeline processing ("P3") is referred to as "cluster" processing. Any number of video analysis applications (referred to in FIG. 1 as P3 Analyzers, P3A1, P3A2, P3An) can access the video feeds and other information from buffers that are between deep frame and cluster stages, through a cluster API. Various applications tailored to recognize and identify certain occurrences may plug into the pipeline via the cluster API, to perform analyses on the video streams across time (i.e., across frames in the same video stream) and across cameras (i.e., within a "cluster" of cameras that, for analysis purposes, are treated as an entity). For example, events based on analyses of the video streams at the cluster stage of processing may include various tailored analyses and construction of associated events, such as person or face events, alert generation events, and the like.

An event that is constructed based on video feeds from multiple cameras, (i.e., a cluster of cameras), is referred to as a "cluster event." Cluster events provide information to intelligently describe what occurred in a building lobby rather than what happened in view of camera X, where camera X is only one of a plurality of cameras operating in the lobby. For example, a cluster event may describe that a person walked through a building lobby, through a door, and down a hallway, based on the video streams from a cluster of cameras whose collective view covers the lobby, the door and the hallway.

At the cluster stage of processing, events can be defined by, constructed based on, or triggered by, events external to the associated video streams. For example, activation of a fire alarm by an external system may trigger a P3 analyzer that is monitoring the building to automatically begin construction of a "fire alarm" event, in order to observe happenings in the building around the time of the fire alarm.

Events, either cluster events or non-cluster events, are constructed by P3 analyzers at the cluster stage of processing, based on video received from the deep frame stage and/or information extracted from objects output by the deep frame analyzers. Events are output from the cluster stage and stored in an event database.

In one embodiment, each event is embodied as a row in the event database, where each row contains (1) metadata—information that describes whatever the analyzer determined about what occurred in the area observed (i.e., information about the content of the video frames or clips), for which the event was constructed, and (2) links—references to the video data content, such as frames or clips, that are associated with the event. For example, a link to an event row may include a pointer to a video clip that is stored in a separate file store. The video data may originate from a camera in the surveillance system, or may be obtained from an external system.

Further analysis and reasoning can be applied to events, or combinations of events, that are stored in the event database. From a database record containing links to the location in the file store at which frames and clips are stored, the associated frames and clips can be replayed and reviewed, for example, by a user via a display monitor or by database stage analyzer applications via a database API.

Stage 4 of the pipeline processing ("P4") is referred to as database processing. Any number of video analysis applications (referred to in FIG. 1 as P4 Analyzers, P4A1, P4A2, P4An) can access records from the event database for database processing, through the database API. Various applications tailored to perform complex analysis across events and across clusters may plug into the pipeline via the database API, to perform analyses such as historical analyses, person/place/time reports, object/person associations and identification, and the like. As discussed in more detail below, the Data Storage Management module 355 may include P4 applications that use the database API.

The pipeline architecture enables the use of correlation processing among different analyzer applications at any of the stages of processing along the pipeline. Correlation processing involves establishing and evaluating rules that apply to the results of more than one analyzer at a given stage of processing. The rules contain conditions based on the results of each of the relevant analyzers, and disposition of the conditions are used to make decisions. For example, if one analyzer determines that a frame "might" contain a person and if another analyzer determines that the frame "might" contain a gun, neither determination of which is independently enough for the respective analyzers to create an event based thereon, then a conditional correlation rule may be applied to those discrete determinations to determine that an event should be created for those frames and passed down the pipeline for further processing.

Object Recognition

A method of identifying objects in the video images acquired by the surveillance system is described in co-pending U.S. patent application Ser. No. 11/081,753, entitled INTERACTIVE SYSTEM FOR RECOGNITION ANALYSIS OF MULTIPLE STREAMS OF VIDEO, filed on Mar. 15, 2005, the contents of which have been incorporated by reference in their entirety for all purposes. In the system described in this co-pending application, hereinafter referred to as the "Recognition" application, a person can be reliably recognized or identified by a surveillance system operating in a naturalistic environment through facial recognition techniques that utilize utilize multiple sets of identifying information associated with each person.

Object recognition is used by embodiments of the present invention when assessing the importance of a segment of video data. For example, in one embodiment, an event may be generated when a person authorized to be in one location is recognized as being in another location for which he does not have authorization. Metadata about this event may be stored in the event database, and the segment of video data associated with this event may be determined to be important enough to store in a separate video data database.

In a video surveillance system that incorporates facial recognition techniques, a single frame of surveillance video data that contains an image of a person's face is identified, facial identification information is extracted from the image, and then compared with stored identifying information associated with faces of known persons. In the system disclosed in the Recognition application, multiple sets of identifying information are stored for each person known by the system. The stored sets of identifying information are created from naturalistic images of the person previously caught by the surveillance system, and positively identified by either the system automatically or by an expert user. By using multiple sets of identifying information derived in the naturalistic surveillance environment, the recognition techniques disclosed in the Recognition application can be used to reliably identify a person or object.

One technique disclosed in the Recognition application is to have an expert user confirm or correct less reliable object identifications made by the surveillance system. For instance, an expert user may review all object identifications made by the system that have confidence scores that do not meet a predetermined threshold. In particular, one specific technique disclosed in the Recognition application is to compare a set of identifying information extracted from a surveillance video image to stored sets of identifying information, and rank the confidence scores determined for each comparison. The top ranked scores are analyzed to determine a "best match" for the object in the extracted video image. If a best match cannot be determined with the required degree of confidence, however, the preliminary identification information associated with the top ranked scores is reviewed by an expert user who either confirms or corrects any preliminary identification made by the system. The expert user's review of the video data associated with the extracted set of identifying information may also result in the extracted set of identifying information being stored as a new set of identifying information for the object identified by the expert user. By having an expert user review the less reliable identifications made by the system, and storing sets of identifying information that are positively identified by an expert user, the system can provide more accurate identifications as more data (i.e., more positively identified sets of identifying information) is collected by the system. This "scrubbing" of the less reliable preliminary object identifications made by the surveillance system by expert users allows for a more robust and reliable video surveillance recognition system.

Although a method of automatically reducing data storage based upon the identification of objects in surveillance video data is described using the object recognition methods disclosed in the co-pending Recognition application, it will be apparent to those skilled in the art that embodiments of the intelligent video data management method disclosed herein could be used by any type of system that performs reliable object recognition, and use of the methods disclosed in the Recognition application is not required.

SIGNIFICANT EVENT DETERMINATION

A method of identifying significant events in the video data acquired by the surveillance system is described in co-pending U.S. patent application Ser. No. 11/082,026, entitled INTELLIGENT EVENT DETERMINATION AND NOTIFICATION IN A SURVEILLANCE SYSTEM, filed on Mar. 15, 2005, the contents of which have been incorporated by reference in their entirety for all purposes. In the system described in this co-pending application, hereinafter referred to as the "Event Determination" application, the detection of the occurrence of a significant event can trigger intelligent notifications.

As described in the Event Determination application, once an object in a video image has been reliably identified, information about the identified object and about the circumstances in which the video data was captured is used to determine whether a "significant" event triggering an automatic action by the system, such as a notification, has occurred. One technique disclosed in the Event Determination application is to determine attributes about a potential event, and attributes about an object in an image associated with the potential event, to determine whether a "significant event" has occurred. The attributes about the object may include an identification. Even if a positive identification cannot be made, some information about the object may be determined, such as class or group membership, or a list of probable identification candidates.

Although a method of determining automatic data storage management actions based on the occurrence of an event is described using the event determination methods disclosed in the co-pending Event Determination application, it will be apparent to those skilled in the art that embodiments of the intelligent video data storage management method disclosed herein could be used by any type of system that performs intelligent event determination, and use of the methods disclosed in the Event Determination application is not required.

Separation of Metadata from Video Data

As described above, when an event occurs in the surveillance system, as determined by Event Determination module 352, event "metadata" (i.e., information about the event) may be stored in data store 360. For example, the metadata may be stored in a row of an event database. Alternatively, instead of single row in a database, the metadata may be spread across multiple tables. Generally, metadata is stored in a database and appropriately linked to other stored data, as desired.

Metadata may include such information as time, location, type of event, and potentially an identification of a person or object if Recognition module 350 recognizes or identifies an object in the video data associated with the event. As described in the Event Determination application, even if a positive identification cannot be made, it is possible that some identification information, such as group membership or a list of potential identification candidates, can be determined and stored as metadata.

Video data associated with the event can be stored in the same database, or the video data can be stored in a separate video database, or even a separate file store. The associated video data can be a video clip, or individual frames taken from the video data. For example, metadata may be stored in a row in an event database that also contains one or more links, pointers or other location finding information that identify where the video data associated with the event is stored, so that the video data can be easily identified and, if needed, loaded when a user wants to review the video data associated with an event. In one embodiment, the pointer in the event database may link to raw video source data.

The separate video database or file store can be located in the same location as the database that stores metadata. For instance, a separate video database for storing associated video data may be created on the same disk drive in which the event database that stores event metadata is located. Alternatively, the separate video database or file store can reside on a removable disk or other archival media that has to be loaded into the surveillance system when a user wants to review the video data shared therein. In a preferred embodiment, some video data can be stored in the same location as the database, while other video data is stored on a removable archival disk. For example, video data associated with events that are determined to be more important may be stored in the same location as the event database for faster access, while less important video data is stored on archival media.

In addition, video data can be moved from one storage location to another. For instance, a system can be configured such that any video data taken within the past 24 hours will always be stored in the same location as the event database or in the event database itself, while video data that has aged 24 hours and has been identified as not being essential is moved to archival media. The video data location link in the row associated with the event in the event database is simply updated to reference the new location should its associated stored video data be moved.

The amount of storage space required for storing the event metadata is significantly less than the amount of storage space required to store the video data that contains images of the event itself. By including links to the frames or clips associated with the event instead of the actual video data in the event database, storage space used by the database is significantly smaller. In addition, event metadata is easily indexed, and therefore searchable. In many cases, the metadata is more useful than the video data from which the metadata is derived.

Most surveillance systems attempt to store all video data captured by the system regardless of its relevance. Due to the enormous amount of storage space required, these systems typically can only store captured data for a short period of time before deleting it, rolling it over, or archiving it. The methods disclosed herein take advantage of the above-described difference in storage space requirements of video data and metadata to allow for permanent or semi-permanent storage of event metadata while selectively deleting, compressing or remotely archiving video image data associated with less important events, as determined by the Data Storage Management module 355. The event database is smaller because it typically contains only event metadata, and therefore information about events can be readily made available for years after the event occurs.

Although the separation of event metadata from the event's associated video data is described using the pipeline architecture, this concept can apply to any architecture used to implement a video surveillance system. A video surveillance system implemented with the pipeline architecture is not required.

Intelligent Data Reduction

The intelligent data storage management methods disclosed herein assess the relevancy and importance of video data generated by a video surveillance system to determine what portions of the video data should be stored as readily available data, and which portions of the video data should be compressed, archived or deleted. An assessment can be made at the time the video is captured to determine if the video data should be stored initially. In addition, automatic assessments can be made after the video data has been stored to determine whether the video data is still considered important enough to warrant further storage, or to change how the video data is stored. Assessments to determine whether the data is important enough to warrant continued storage may also be made on an ad hoc basis, such as when used storage space has exceeded a predetermined maximum, or at any time a user wants to "prune" the stored data.

The disclosed methods prioritize the storage of data according to relevancy and importance. Typically, only video data that warrants further examination is considered important enough to store initially. For example, consider a surveillance system that captures video of a hallway in an office building. Between the hours of midnight and 5 a.m., there is typically no activity. Instead of storing a static video featuring five hours of zero activity, the surveillance system can be configured to automatically compress the video upon capture, and then delete the video once it has been confirmed that no activity took place. If, however, a potential security event is detected in the video or by an external sensor or system, the system can be configured to store video data in uncompressed format continuously until it is determined that the video data no longer provides any value.

As another example, consider a surveillance system that has a video camera focused on a door and is configured to store video data only whenever a motion detector at the door senses motion. If for some reason, the swaying of a tree in the background of the captured video causes a motion sensor to detect motion, the surveillance system will store the video data, at least initially. In this case, the video data is potentially "interesting" or "important" as there is a possibility that an image of an unauthorized person entering the building is captured by the video data, for example. However, if no face is found in the stored video data and no security events were reported during the relevant timeframe, the video data loses its importance and may be determined to be a candidate for future deletion. On the other hand, if, for example, a vandalism attack is reported to have occurred during the timeframe that motion was detected and video data was stored, the stored video data may be determined to be important enough to continue storing until a user determines that the video data is unrelated, or stored permanently if it is determined that the video data contains information about the attack.

Because metadata derived from video data is much smaller than the video data itself, the metadata can be stored in a database indefinitely, while the video data on which the metadata is based can be deleted, archived or compressed. In addition, using the disclosed methods, it is possible to selectively store only that video data within a particular video data stream that is determined to be important. For example, if it is determined that a particular 5-minute segment within a 12-hour video stream is important, that 5-minute segment can be extracted and stored, while the remaining video data is discarded. Furthermore, as another example, suppose that a 5-minute segment is extracted and stored. If it is later determined that only a few frames of the segment are important, the identified frames can be stored, while the rest of the 5-minute segment is deleted.

The disclosed methods optimize system performance while reducing hardware costs and enabling more robust video analysis. Only data that is necessary to achieve security goals is stored. Key event information and images can be stored for years while less important video data is intelligently aged based on relevancy and importance.

Through Data Storage Management module 355, only relevant video data, determined according to a user's preferences and configuration, is initially stored, and stored data can be automatically "pruned" to eliminate or reduce less important data as the data ages. The Data Storage Management module permits regular, automatic reduction or relocation of data to be performed according to configurable settings. In addition, the Data Storage Management module can be used in an ad hoc manner to perform data reduction whenever the need arises.

STORAGE MANAGEMENT RULES

In one embodiment, a surveillance system is configured to store data and automatically reduce data in accordance with "Data Storage Management Rules" entered by a user. In particular, Data Storage Management Rules may include preferences, configuration settings, and other information entered by one or more users to indicate (1) per-camera settings for specifying what data to initially store, and how/where to store it, potentially including time parameters, video data storage location parameters, and storage compression parameters; (2) whether and how video data associated with an event should be stored when an event is detected, potentially including type of event parameters, time parameters, video data storage location parameters, storage compression information, and parameters used to determine event importance; and/or (3) what conditions will trigger an automatic assessment of the importance of stored data, how the importance is to be assessed, and how the data is to be reduced (e.g., delete, compress, archive) in accordance with the assessment.

The Data Storage Management Rules ("the Rules") may be entered by a user through user terminal 345 of surveillance system 300 shown in FIG. 3. Preferably a user is given the opportunity to update the Rules as desired, and the Rules can be changed at any time. Various examples of Rules, and how a system configured with the example Rules store data, are given below. Those skilled in the art will realize that many additional variations and combinations of Rules are possible.

TIME/CAMERA-BASED STORAGE RULES

In a multi-camera surveillance system, the surveillance system may be configured by the Rules to store the output from each camera at different times and/or different amounts of time. As an example, a surveillance system may be configured to store all data from any camera captured between 6 p.m. and 6 a.m., with different storage rules between the hours of 6 a.m. and 6 p.m. For example, Camera 1 may be configured to store all video data from 6 a.m. to 10 a.m., Camera 2 may be configured to store all video data from 9 a.m. to 5 p.m., and Cameras 3 and 4 may be configured to not store any video data at all from 6 a.m. to 6 p.m. "Per-camera" Rules entered by a user determine how output from each camera is treated at a particular time.

In addition, the Rules can include per-camera rules for specifying how to initially store data, and where to store it. For example, the surveillance system may be configured with per-camera Rules that specify that output from a first camera is to be stored in a compressed format in a video database that is located in a separate location from the event database, while output from a second camera is to be stored in the event database itself as uncompressed data.

Various combinations of time and initial storage rules can be configured for each camera, or for a group of cameras.

ASSESSED VALUE-BASED STORAGE RULES

In addition to per-camera time and storage rules, the value of video data may be assessed and used to determine how to store video data. The value of video data may be based on, among other things, which events (if any) were detected in the video data. For example, object recognition may be used to assess the importance of the video data relating to a detected object, and to specify how to treat the video data associated with the object detection event.

In one embodiment, the Rules associated with an event may override per-camera initial storage rules. For example, a first rule may be specified that all data from cameras 1 and 2 captured between 9 a.m. and 5 p.m. is to be stored in compressed format. However a second rule may specify that when a face finding application detects a face, the associated video data is to be stored in uncompressed format. In this embodiment, if a face is detected in video data from camera 1 at 2 p.m., it will be stored in uncompressed format, in accordance with the second rule.

Different storage rules may be specified for video based on the video data's assessed value. For example, if the system recognizes that a person has entered a building, but cannot positively identify the person, this is a more important event than the entry of an identified authorized employee. The Rules can configure the surveillance system to store video data relating to the unknown person entering the building while archiving or deleting the video data relating to the authorized employee entering the building after a positive identification of the employee has been made.

In this example, while video data relating to the employee may be deleted, event metadata that captures information about the employee's entry, such as employee identification, date, time and location entry, may be stored in the event database, as the metadata may have value without the video data of the employee entering the building, and the storage cost for storing the metadata is significantly smaller than the storage cost for storing the associated video data. This is an important feature, as authorized personnel may enter a building 50 times a day. Storing video data for each entry would needlessly use vast amounts of storage space, while storing event metadata only requires a very small amount of storage space, and is more useful.

Many different rules for assessing the value of detected events are possible. For instance, using the above example, the rules could configure the surveillance system to save video data for the first and last entry of authorized personnel, while discarding video data relating to all entries in between, and saving metadata relating to every entry.

EVENT DETECTION

If implemented using the architecture disclosed in the co-pending Pipeline application, for example, an event may be detected as part of a "P1" motion sensing or gross object finding application that uses a P1 pipeline API to communicate with the surveillance system. An event may also occur when a person or object is identified in the video data using the techniques described in the Recognition application.

For example, event detection could occur when an object with an attached Radio Frequency ID (RFID) tag passes through an RFID monitored portal. Alternatively, an event could be detected by infrared sensors, motion sensors, optical sensors, audio sensors, or other sensors that are connected to the surveillance network 302 of FIG. 3 (e.g., sensor 320). For example, a motion sensor could be used to detect motion at a particular entry to a protected area. As another alternative, an automated video motion detection process may be used to detect motion in video data. As another alternative, a gross object finding application may be used to detect that not only has motion occurred at a particular entrance of a secure area, but that the detected motion is the motion of a person, and not that of some other type of object, such as a machine, vehicle, or animal, or that the detected motion is motion in a particular direction. Many methods of motion detection, gross object detection and detection of the direction of movement are known to those skilled in the art and can be used by embodiments of the present invention to detect the occurrence of an event.

Events may also be detected by external systems and communicated to the surveillance system. Referring back to FIG. 3, an event may be determined by external system 325 and communicated to the surveillance system server 340 through surveillance network 302. Examples of such potential external events are fire alarms, environmental input alarms, key card system alerts, RFID system alerts, etc.

EVENT TYPES

There are many different types of possible events that can be configured in the Rules. In general, most events result from the occurrence of some type of action, such as motion being detected by a motion detector, or an alarm being passed into the surveillance system from an external system. Events may also occur as the result of the identification of an object in video surveillance data. For example, the recognition or identification of an authorized employee may be considered a first type of event, while a second type of event is the determination that a video image contains a face, but the Recognition module is unable to positively identify the person in the image. Furthermore, different types of events may be associated with different Rules. For example, Rules for motion events may specify that video data associated with a motion detection event be stored in compressed format, while Rules for entry of an unauthorized person events may specify that the video data associated with an event be stored in the event database itself for faster access.

AUTOMATIC DATA IMPORTANCE ASSESSMENT RULES

In one embodiment, Data Storage Management Rules include Data Importance Assessment Rules ("Assessment Rules") that specify (1) one or more conditions in which the importance of currently stored data will automatically be assessed, (2) parameters for assessing the importance of the data, and (3) how to reduce the data based on the assessment. For example, the Assessment Rules may include a Rule that specifies that automatic data reduction is to occur at midnight every day, at which time all stored video data that has not been linked to an event is deleted, and all stored video data associated with positively identified authorized personnel is compressed and archived.

A condition prompting automatic data assessment may be a time of day, the age of stored data (e.g., all stored uncompressed data should be automatically be archived when it is a week old), whether an object identification has been made on the video data, etc. Various conditions may also be combined in an Assessment Rule. As will be apparent to those skilled in the art, there are many different types of conditions that can be specified in an Assessment Rule.

There are a number of ways to reduce the data in accordance with an Assessment Rule. For instance, data may be marked for deletion (or other type of data reduction) at the time an event is detected, wherein all such marked data is deleted (or otherwise reduced as specified in the Assessment Rule) whenever a condition that matches the Assessment Rule is detected. For example, consider an Assessment Rule that deletes all video data that has been marked for deletion at midnight every day. In this example, video data that contains an image of a person's face may be marked for deletion at the time the person is positively identified, and then actually deleted at midnight, as specified in the Assessment Rule. The video data may be marked for deletion manually by a user. Alternatively, it may be marked for deletion by another Data Storage Management Rule associated with an identification event. In this case, a Rule associated with an event marks the video data for deletion, and an Assessment Rule actually deletes the video data upon the occurrence of the associated condition (e.g., time of day, etc.). Alternatively, a Data Storage Management Rule for an identification event may specify that data is to be deleted (or some other specified manner of reduction) at the time the event is detected (e.g., the object is identified).

SYSTEM OPERATION—EXAMPLES

Figure 4A:
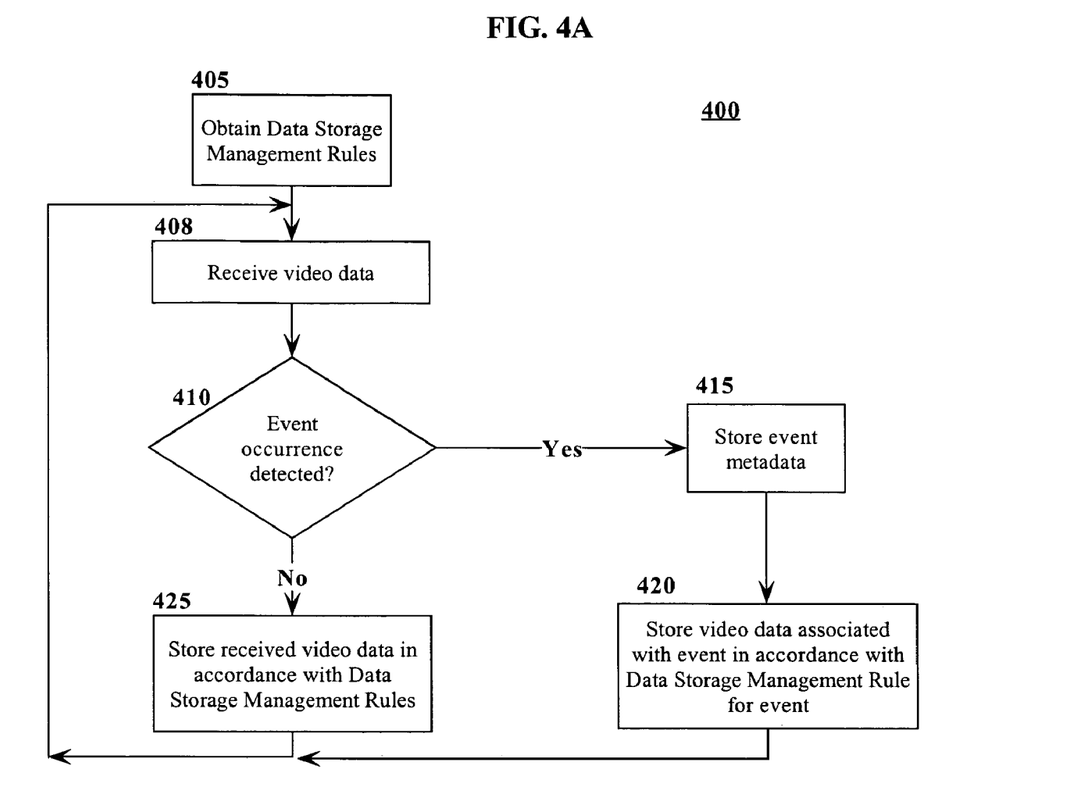
FIG. 4A is a flowchart illustrating one embodiment of applying Data Management Storage Rules to store data in a surveillance system.

Referring to FIG. 4A, a flowchart of data storage management process 400 is depicted in accordance with one embodiment of the present invention. As shown, Data Storage Management Rules are first obtained in step 405. Although shown as a one-time occurrence, preferably Data Storage Management Rules can be updated at any time. At any point in the process at which Data Storage Management Rules are used, it is implied that the most recently updated version of the Rules are used.

In this embodiment, the surveillance system receives video data, preferably from multiple cameras, at step 408. Video data may also be obtained from external sources. When an event is detected in the received video data at step 410, the metadata about the event is determined and stored at step 415. As discussed above, there are many different types of events that could be detected, such as motion detector events or face finding application events, for example.

Metadata can include a wide variety of information, depending on the event. For example, if the event is motion detected by a motion detector, event metadata could include such information as location of the motion detector, direction of movement, and time of motion detection. Event metadata may also be derived from the input from a plurality of cameras in the multi-camera surveillance system. For example, a first camera may detect the presence of a person at an entry, and a second camera may detect the presence of a person walking down a hallway connected to the entry a few seconds after the first camera detected a presence, resulting in a "cluster event" as described above. Event metadata may also include information provided by an external system input, such as an identification of the person associated with a key card entry, or time and location of a fire alarm.

The Data Storage Management Rule corresponding to the event determines whether and how event metadata is to be stored. Metadata for an event may be stored in an event database, for example. In addition, the Rule corresponding to the event may also determine whether and how any video data associated with the event is to be stored, and how to store the associated video data, in step 420.

If no event as configured by the Data Storage Management Rules is detected at step 410, the video data is stored in accordance with the Data Storage Management Rule associated with the source of the video data. In particular, per-camera Rules may be specified. For example, the Rules may indicate that by default all video data from all cameras in a multi-camera surveillance system is to be stored from the hours of 9 a.m. to 5 p.m., while only video data from one particular camera is to be stored from 5 p.m. until 9 p.m., and that no data is stored from 9 p.m. until 9 a.m. in the absence of an event. Only when an event (as defined by the Data Storage Management Rules) is detected will video data be stored otherwise, in this example.

In the embodiment shown in FIG. 4A, the Rules associated with event detection may cause the surveillance system to store video data in a different manner than specified by the default rules. For example, the default and/or per-camera Rules may indicate that video storage data is to be stored in a compressed format at a particular location. However, when the occurrence of a particular event is detected at step 410, the Rule associated with the event may cause the video data to be stored in an uncompressed format at a different location at step 420. However, the detection of an event does not necessarily mean that the manner of storing video data changes. A system can be configured to store all video data, at least temporarily, whether or not any event is detected.

Figure 4B:
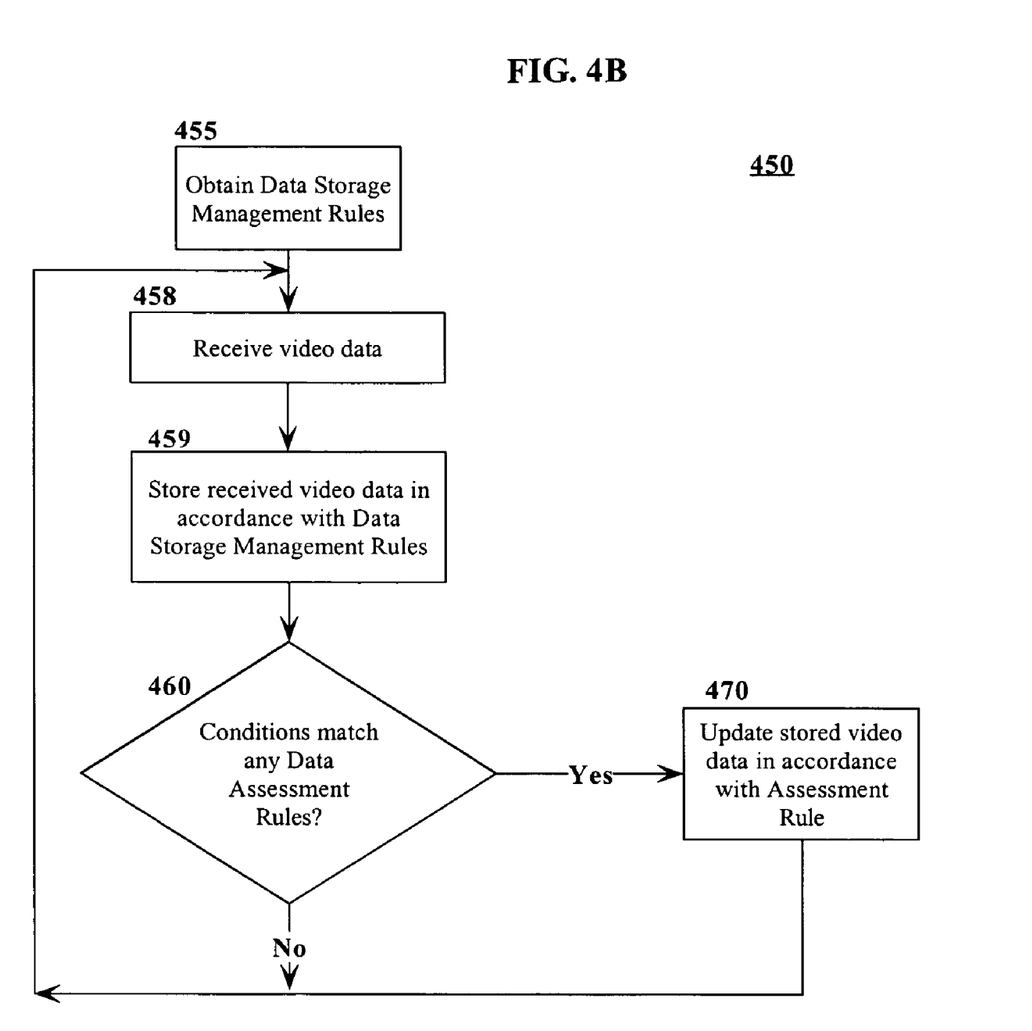
FIG. 4B is a flowchart illustrating another embodiment of applying Data Management Storage Rules to store data in a surveillance system.

FIG. 4B illustrates a flowchart according to a second embodiment. In process 450, Rules are obtained in step 453, video data is received in step 458, and stored in accordance with storage Rules at step 459. Process 450 continuously monitors and evaluates conditions, and when conditions that match an Assessment Rule are detected at step 460, the stored video data is automatically reduced in accordance with the matched Assessment Rule at step 470.

For example, suppose an Assessment Rule that specifies that at midnight every day, all video data that is associated with a positively identified employee is to be deleted, and all video data that is associated with a positively identified non-employee is to be compressed and archived. Using this example, data is initially stored in accordance with the Rules at step 459. At midnight, it is determined at step 460 that a condition has been met, and step 470 is invoked, and all video data associated with an identified employee is deleted, and all video data associated with a positively identified non-employee is compressed and archived in accordance with the Assessment Rule.

There are many different techniques for reducing the stored data through Assessment Rules, including deletion, compression, archival, resampling an image to reduce noise or extracting selected images from a video segment for storage while deleting the video data.

FIGS. 4A and 4B can be used alone or in combination. One particular example of how the processes of FIGS. 4A and 4B can be used together to automatically reduce stored video data that has become less important is when data is "scrubbed", as described in the Recognition application.

As described above with respect to the Recognition application, when a surveillance system determines that an object is captured in a video image but cannot positively identify the object, an expert user may later "scrub" the data by confirming or correcting a preliminary identification made by the system. The process of FIG. 4A can be used to store video images associated with objects that cannot be positively identified by the system for later review by an expert, and the process of FIG. 4B can be used to ensure that video data is deleted after the data is "scrubbed", thereby automatically reducing the amount of stored video data.

When using process 400 in this example, a user may enter a first Rule in step 405 indicating that by default, video data is not stored. A second Rule may specify that detecting an object in the video data is an "event", and further specifies that if an object can be positively identified in the video data associated with the object detection event, a single frame is extracted from the video data and stored in compressed format on archival media. However, if an object cannot be positively identified in the video data, a third Rule, which is an Assessment Rule in this example, specifies that all video data that is 48 hours old is to be compressed and moved to archival media. At this point, an expert user should have reviewed the video data and made any necessary corrections.

At step 410 of process 400 in FIG. 4A, an event occurrence is detected when an object is detected in the video data. Metadata related to the object detection event is determined and stored in the event database at step 415. This metadata may include object identification if the object can be positively identified. If the object cannot be positively identified, the metadata may include a list of potential identification candidates (i.e., "best matches").

At step 420, if an object can be positively identified, a single image is extracted from the video data, compressed and stored in archival media per the second Rule. The event database is updated to reflect the location of the stored compressed image. If an object cannot be positively identified, however, the segment of video data associated with the event is stored in the same location as the event database.

At some point, an expert user reviews the video data associated with any objects that could not be positively identified, and corrects or confirms any preliminary identifications made by the system.

Step 460 of process 450 of FIG. 4B is invoked when video data is 48 hours old. At step 470, the video data is compressed and archived in accordance with the third Rule.

Those skilled in the art will recognize that the processes of FIG. 4A and/or 4B can be used in many different systems and many different situations, and is not limited to the examples described herein.

In addition, ad hoc data reduction requests may be entered at any time. For example, a user may enter an ad hoc data reduction request through user terminal 345 in FIG. 3 to delete all video data that is more than one year old. For example, an expert user reviewing video data can delete or compress data at any time through ad hoc requests.

VARIATIONS AND ALTERNATIVES

The above-described pipeline architecture may be used to implement an embodiment of the techniques described herein, although as will be apparent to those skilled in the art, embodiments may be implemented in any surveillance system, and are not limited to this architecture. In addition, the techniques disclosed herein are described using facial recognition as a means for object or person recognition, however, any type of object recognition process may be used to identify any object whose image is obtained in a surveillance system, such as a weapon, suitcase, vehicle and the like. Furthermore, although the techniques are described using video cameras, it will be apparent to those skilled in the art that any camera or device used to produce a sample can be used. For example, voice samples may be recorded from multiple recorders and used as identification input.

GENERAL COMPUTER SYSTEM

Figure 2:
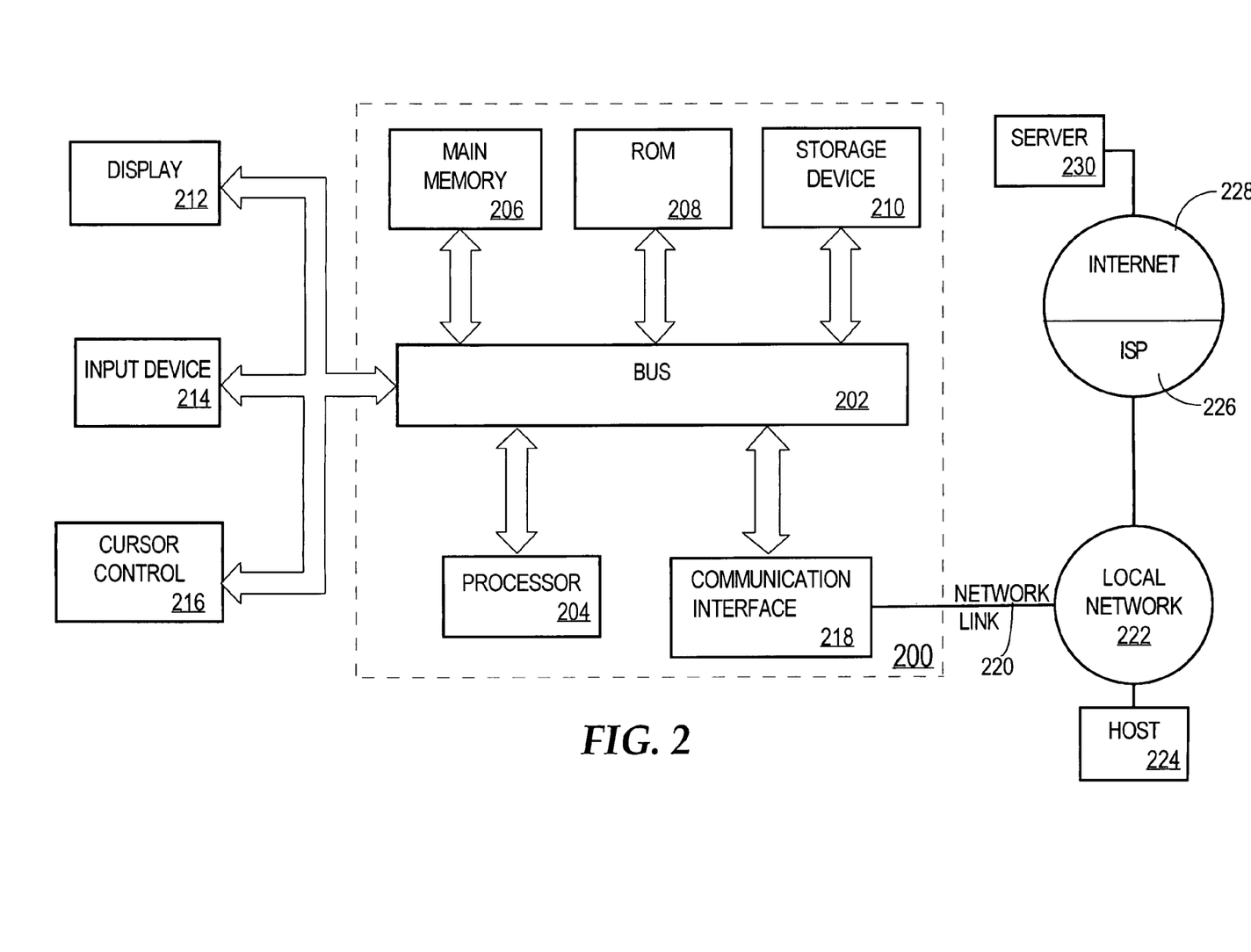
FIG. 2 is a block diagram that illustrates a computer system upon which an embodiment of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of managing data storage in a video surveillance system that monitors a physical environment, comprising the computer-implemented steps of:

receiving user input that specifies a plurality of rules;

wherein each rule of the plurality of rules is associated with (a) an event type and (b) storage information that indicates at least one of (1) where to store or (2) how to store video data that is associated with events, of the event type, that occur in or around the physical environment;
wherein a first rule of the plurality of rules is associated with a first event type and a second rule of the plurality of rules is associated with a second event type that is different than the first event type;
receiving video data;
detecting that a particular event occurred in or around the physical environment;
in response to detecting the particular event,
  determining a particular event type for the particular event,
  identifying a particular rule, of the plurality of rules, that is associated with the particular event type,
  reading storage information associated with the particular rule, and
  storing video data, captured by the video surveillance system and associated with the particular event, in accordance with the storage information;
wherein the steps are performed by one or more computing devices.

2. The method of claim 1, wherein said second rule specifies a different time period, compression setting, and/or storage location for storing video data than said first event rule.

3. The method of claim 1, wherein:
said particular rule specifies how and where to store video surveillance system data received from a first camera;
said second rule specifies how and where to store video surveillance data received from a second camera that is different than the first camera.

4. The method of claim 3, wherein:
said particular rule further specifies at least one time period, and the step of storing received video data in accordance with the particular rule further comprises determining which video data to store based on a comparison between time information associated with the video data and the at least one time period specified in the particular rule.

5. The method of claim 1, further comprising the computer-implemented steps of:
updating data storage in accordance with a data reduction request received from a user or generated in response to a particular event.

6. The method of claim 1, wherein:
the particular rule comprises event metadata storage information and video data storage information; and
the step of storing received data in accordance with the particular rule comprises:
  determining metadata about the event of the particular event type,
  storing the determined metadata in accordance with the event metadata storage information of the particular rule, and
  storing video data associated with the particular event of the particular event type in accordance with the video data storage information of the particular rule.

7. The method of claim 6, wherein:
said event metadata storage information includes an identification of an event database for storing metadata;
said video data storage information includes an identification of a video data storage location for storing video data associated with the particular event of the particular event type, said video data storage location being separate from the event database; and
said step of storing received data in accordance with the particular rule additionally comprising:
  storing the video data associated with the particular event of the particular event type in the video data storage location; and
  storing determined metadata with a link to the stored video data in a row in the event database.

8. The method of claim 6, wherein the video data storage information specifies storing video data on archival media that is separate from the event database.

9. The method of claim 6, wherein:
the method further comprises the computer-implemented step of determining that the received video data contains an object; and
the step of determining metadata comprises determining at least one potential identification candidate for the object.

10. The method of claim 9, wherein the step of determining metadata further comprises determining a best match for the object in the received video data.

11. The method of claim 10, wherein the step of determining a best match comprises:
comparing a set of identifying information extracted from the received video data to a plurality of stored sets of identifying information, each stored set of identifying information associated with an object;
calculating a confidence score for each comparison; and
determining a best matching object based on the confidence scores.

12. The method of claim 1, wherein the particular event of the particular event type is an event detected through an external source.

13. The method of claim 12, wherein the particular event of the particular event type is a motion detection event.

14. The method of claim 12, wherein the step of storing received data in accordance with the particular rule comprises:
determining metadata about the specified event from the external source; and
storing the determined metadata in accordance with event metadata information included in the particular rule.

15. The method of claim 1, wherein a third rule specifies a condition and data storage update information, the method additionally comprising the steps of:
detecting the condition specified by the third rule; and
in response to detecting the condition, updating video data storage in accordance with the data storage update information in the third rule.

16. The method of claim 1, wherein the step of receiving video data comprises receiving video data from a source external to the video surveillance system.

17. A method of managing data storage in a video surveillance system, comprising the computer-implemented steps of:
receiving user input that specifies a plurality of rules that include a first rule and a second rule;
wherein the second rule specifies a condition, one or more parameters for assessing the importance of certain video data, and how to update the storage of the certain video data;
wherein the condition must be satisfied in order for the second rule to be evaluated;
receiving video data;
storing the video data in accordance with the first rule;
monitoring the video surveillance system to determine whether the condition is satisfied; and
in response to determining that the condition is satisfied:

identifying the second rule that specifies the condition,
identifying the one or more parameters specified by the second rule,
evaluating metadata associated with the stored video data, in accordance with the one or more parameters, and
updating data storage of the stored video data in accordance with the evaluation;
wherein the steps are performed by one or more computing devices.

18. The method of claim 17, wherein the plurality of rules include a third rule, said third rule associated with a specified event, further comprising the computer-implemented steps of:
detecting the specified event;
determining metadata about the specified event;
storing the determined metadata and the received video data associated with the specified event in accordance with the third rule.

19. The method of claim 18, wherein the step of storing the determined metadata and the received video data further comprises storing the determined metadata and the received video data in separate storage locations, in accordance with the third rule.

20. The method of claim 17, wherein the condition specified in the second rule comprises a time.

21. The method of claim 17, wherein the step of updating data storage comprises reducing the stored video data using a data reduction technique selected from the group consisting of: moving the stored video data to archival media, deleting the stored video data, compressing the stored video data, and resampling the stored video data.

22. The method of claim 17, wherein the step of updating data storage comprises reducing the stored video data using two data reduction techniques selected from the group consisting of: moving the stored video data to archival media, deleting the stored video data, compressing the stored video data, and resampling the stored video data.

23. The method of claim 17, wherein:
said first rule specifies how and where to store video data received from a first camera in the video surveillance system;
said plurality of rules include a third rule specifying how and where to store video data received from a second camera in the video surveillance system that is different than the first camera;
the step of storing the received data in accordance with the first rule comprises:
storing the received video data in accordance with the first rule when the received video data is received from the first camera.

24. The method of claim 17, further comprising the computer-implemented steps of:
updating data storage in accordance with a data reduction request received from a user or generated in response to a particular event.

25. The method of claim 17, wherein:
the condition specified in the second rule comprises a user having verified or corrected an object identification made by the video surveillance system for an object in stored video data; and
the step of updating data storage comprising deleting the stored video data from which an object identification was verified or corrected.

26. The method of claim 17, wherein the condition specified in the second rule comprises an age of stored video data.

27. A computer-readable storage encoded with a computer program for performing the method recited in claim 1.
28. A computer-readable storage encoded with a computer program for performing the method recited in claim 2.
29. A computer-readable storage encoded with a computer program for performing the method recited in claim 3.
30. A computer-readable storage encoded with a computer program for performing the method recited in claim 4.
31. A computer-readable storage encoded with a computer program for performing the method recited in claim 5.
32. A computer-readable storage encoded with a computer program for performing the method recited in claim 6.
33. A computer-readable storage encoded with a computer program for performing the method recited in claim 7.
34. A computer-readable storage encoded with a computer program for performing the method recited in claim 8.
35. A computer-readable storage encoded with a computer program for performing the method recited in claim 9.
36. A computer-readable storage encoded with a computer program for performing the method recited in claim 10.
37. A computer-readable storage encoded with a computer program for performing the method recited in claim 11.
38. A computer-readable storage encoded with a computer program for performing the method recited in claim 12.
39. A computer-readable storage encoded with a computer program for performing the method recited in claim 13.
40. A computer-readable storage encoded with a computer program for performing the method recited in claim 14.
41. A computer-readable storage encoded with a computer program for performing the method recited in claim 15.
42. A computer-readable storage encoded with a computer program for performing the method recited in claim 16.
43. A computer-readable storage encoded with a computer program for performing the method recited in claim 17.
44. A computer-readable storage encoded with a computer program for performing the method recited in claim 18.
45. A computer-readable storage encoded with a computer program for performing the method recited in claim 19.
46. A computer-readable storage encoded with a computer program for performing the method recited in claim 20.
47. A computer-readable storage encoded with a computer program for performing the method recited in claim 21.
48. A computer-readable storage encoded with a computer program for performing the method recited in claim 22.
49. A computer-readable storage encoded with a computer program for performing the method recited in claim 23.
50. A computer-readable storage encoded with a computer program for performing the method recited in claim 24.
51. A computer-readable storage encoded with a computer program for performing the method recited in claim 25.
52. A computer-readable storage encoded with a computer program for performing the method recited in claim 26.

53. A method of managing data storage in a video surveillance system that monitors a physical environment, comprising:
multiple cameras feeding video data into a single pipeline where video analyzers read and process the video data as the video data passes through the pipeline;
storing a plurality of rules that each specifies a particular camera, of the multiple cameras, and a storage location;
after a portion of the video data has been processed by the video analyzers,
determining a camera that captured the portion of the video data,
identifying a particular rule, of the plurality of rules, that corresponds to the camera, and storing the portion of the video data according to the storage location specified in the particular rule;

wherein the method is performed by one or more computing devices.

54. The method of claim 53, wherein:

a first rule of the plurality of rules specifies how and where to store video surveillance system data received from a first camera of the multiple cameras;

a second rule of the plurality of rules specifies how and where to store video surveillance data received from a second camera that is different than the first camera.

55. The method of claim 54, wherein:

the first rule further specifies at least one time period, and the step of storing the portion of the video data further comprises determining which video data to store based on a comparison between time information associated with the video data and the time period specified in the first rule.

56. A computer-readable storage encoded with a computer program for performing the method recited in claim 53.

57. A computer-readable storage encoded with a computer program for performing the method recited in claim 54.

58. A computer-readable storage encoded with a computer program for performing the method recited in claim 55.

* * * * *